US009331785B2

(12) United States Patent
Fang et al.

(10) Patent No.: US 9,331,785 B2
(45) Date of Patent: May 3, 2016

(54) METHOD AND APPARATUS OF BUILDING A COAXIAL CONVERGENCE LAYER IN ETHERNET PASSIVE OPTICAL NETWORK (PON) OVER COAXIAL NETWORK (EPOC)

(71) Applicant: Futurewei Technologies, Inc., Plano, TX (US)

(72) Inventors: Liming Fang, Santa Clara, CA (US); Jim Chen, Corona, CA (US); Li Zhang, Wuhan (CN)

(73) Assignee: Futurewei Technologies, Inc., Plano, TX (US)

( * ) Notice: Subject to any disclaimer, the term of this patent is extended or adjusted under 35 U.S.C. 154(b) by 263 days.

(21) Appl. No.: 13/910,917

(22) Filed: Jun. 5, 2013

(65) Prior Publication Data

US 2013/0322882 A1 Dec. 5, 2013

Related U.S. Application Data

(60) Provisional application No. 61/655,808, filed on Jun. 5, 2012.

(51) Int. Cl.
*H04B 10/27* (2013.01)
*H04L 12/413* (2006.01)
*H04J 3/16* (2006.01)
*H04Q 11/00* (2006.01)

(52) U.S. Cl.
CPC .............. *H04B 10/27* (2013.01); *H04J 3/1694* (2013.01); *H04L 12/413* (2013.01); *H04Q 11/0067* (2013.01); *H04Q 2011/0064* (2013.01)

(58) Field of Classification Search
None
See application file for complete search history.

(56) References Cited

U.S. PATENT DOCUMENTS

| 8,855,063 | B2* | 10/2014 | Gong | H04L 1/1685 370/329 |
|---|---|---|---|---|
| 8,908,742 | B2* | 12/2014 | Jersenius et al. | 375/133 |
| 9,084,277 | B2* | 7/2015 | Montojo et al. | |
| 2006/0127087 | A1* | 6/2006 | Kasai | H04J 14/0226 398/45 |
| 2006/0239285 | A1* | 10/2006 | Nomura | H04J 3/0682 370/408 |

(Continued)

FOREIGN PATENT DOCUMENTS

| EP | 2509259 A1 | 10/2012 |
|---|---|---|
| WO | 2011031831 A1 | 3/2011 |

OTHER PUBLICATIONS

Foreign Communication From a Counterpart Application, PCT Application No. PCT/US2013/044365, Invitation to Pay Additional Fees dated Oct. 10, 2013, 8 pages.

(Continued)

*Primary Examiner* — Benjamin H Elliott, IV
(74) *Attorney, Agent, or Firm* — Conley Rose, P.C.; Grant Rodolph; Adam J. Stegge

(57) ABSTRACT

An apparatus comprising a data framer comprising a physical layer protocol stack comprising a coax convergence layer, a coax framing layer next to the convergence layer, wherein the coax framing layer is configured to decompose and assemble data packets in a coax network, a coax coding layer next to the coax frame layer, wherein the coax coding layer is configured to protect the coax transmissions from impairments, a coax modulation layer next to the coax coding layer, wherein the coax modulation layer is configured to modulate the data according to a coax physical layer (PHY), and a radio frequency layer next to the coax modulation layer and configured to interface to an electrical medium for a coaxial network.

20 Claims, 14 Drawing Sheets

(56) References Cited

U.S. PATENT DOCUMENTS

| | | | | |
|---|---|---|---|---|
| 2007/0172236 | A1* | 7/2007 | Nomura | H04Q 11/0067 |
| | | | | 398/45 |
| 2010/0074628 | A1* | 3/2010 | Murakami | H04L 12/66 |
| | | | | 398/182 |
| 2011/0058813 | A1 | 3/2011 | Boyd et al. | |
| 2013/0239165 | A1* | 9/2013 | Garavaglia et al. | 725/129 |

OTHER PUBLICATIONS

Varanese, N., et al., "EPoC Architecture Considerations," XP-002713589, IEEE 802.3 Interim Session, Minneapolis, MN, May 15-16, 2012, 13 pages.

Chen, J., "An Example of Designing a Coax Convergence Layer in EPoC," XP-002713588, Huawei, 9 pages.

"Draft Standard for Information technology—Telecommunications and information exchange between systems—Local and metropolitan area networks—specific requirements, Part 3: Carrier Sense Multiple Access with Collision Detection (CSMA/CD) Access Method and Physical Layer Specifications, Amendment: Physical Layer Specifications and Management Parameters for 10 Gb/s Passive Optical Networks," IEEE P802.3av D2.2, Dec. 3, 2008, 267 pages.

"Operating the EPON protocol over Coaxial Distribution Networks Call for Interest," IEEE 802.3 Ethernet Working Group, Atlanta, GA, Nov. 8, 2011, 38 pages.

Hangzhou, "Broadcom Introduces DOCSIS-based EoC for EPON Product Portfolio in Support of China's Network Convergence," Press Release, Oct. 27, 2010, 2 pages.

Foreign Communication From a Counterpart Application, PCT Application No. PCT/US2013/044365, International Search Report dated Feb. 21, 2014, 7 pages.

Foreign Communication From a Counterpart Application, PCT Application No. PCT/US2013/044365, Written Opinion dated Feb. 21, 2014, 9 pages.

"Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks," IEEE Std 802.3ah, Sep. 7, 2004, 640 pages.

"HomePNA Modem for MDU Endpoints," CG3310M, Sigma Designs, May 21, 2012, 2 pages.

"DOCSIS EoC for EPON in China," Oct. 2010, 14 pages.

* cited by examiner

EPON MPCP Gate message with time slot information
EPoC MAP (Media Access Plan) with Frequency-Time information

METHOD AND APPARATUS OF BUILDING A COAXIAL CONVERGENCE LAYER IN ETHERNET PASSIVE OPTICAL NETWORK (PON) OVER COAXIAL NETWORK (EPOC)

CROSS-REFERENCE TO RELATED APPLICATIONS

The present application claims priority to U.S. Provisional Patent Application 61/655,808, filed Jun. 5, 2012 by Liming Fang, et. al., and entitled "Method and Apparatus of Building a Coaxial Convergence Layer in Ethernet Passive Optical Network (PON) over Coaxial Network (EPoC)", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point-to-multipoint (P2MP) network comprised of an optical line terminal (OLT) at the central office, an optical distribution network (ODN), and a plurality of optical network units (ONUs) at the customer premises. Ethernet passive optical network (EPON) is a PON standard developed by the Institute of Electrical and Electronics Engineers (IEEE) and specified in IEEE 802.3ah and 802.3av, both of which are incorporated herein by reference. The OLT implements an EPON Media Access Control (MAC) layer for transmission of Ethernet Frames. The Multi-Point Control Protocol (MPCP) performs bandwidth assignment, bandwidth polling, auto-discovery, and ranging. Ethernet frames are broadcast downstream based on the Logical Link Identifier (LLID) embedded in the preamble frame. Upstream bandwidth is assigned based on the exchange of Gate and Report messages between an OLT and an ONU.

Ethernet over Coaxial (EoC) is a generic name used to describe all technologies which can be used for transmission of Ethernet frames over a unified optical-coaxial network. The name comes from the fact that, except for Data Over Cable Service Interface Specification (DOCSIS), all these technologies have in common that the Ethernet Frames are transmitted in the MAC layer. Different EoC technologies exist, including Multimedia over Coax Alliance (MoCA), G.hn (a common name for a home network technology family of standards developed under the International Telecommunication Union (ITU) and promoted by the HomeGrid Forum), HomePNA Alliance (HPNA), and Home Plug Audio/Visual (A/V), and they have been adapted to run the outdoor coaxial (coax) access from an ONU to an EoC Head End with connected Customer Premises Equipment (CPEs) located in the subscriber homes.

There is a rising demand which requires the use of EPON as an access system to interconnect with multiple coaxial cables to terminate the Coaxial Network Units (CNUs) located in the subscriber's home with an Ethernet PON over Coaxial (EPoC) architecture. Consequently, there is a need in the art for methods and systems to provide an end to end fiber to coaxial upstream and downstream transmissions, including scheduling and maintaining the Quality of Service (QOS) or Service Level Agreement (SLA) from OLT to CNUs.

SUMMARY

In one embodiment, the disclosure includes an apparatus comprising a data framer comprising a physical layer protocol stack comprising a coax convergence layer, a coax framing layer next to the convergence layer, wherein the coax framing layer is configured to decompose and assemble data packets in a coax network, a coax coding layer next to the coax frame layer, wherein the coax coding layer is configured to protect the coax transmissions from impairments, a coax modulation layer next to the coax coding layer, wherein the coax modulation layer is configured to modulate the data according to a coax physical layer (PHY), and a radio frequency layer next to the coax modulation layer and configured to interface to an electrical medium for a coaxial network.

In another embodiment, the disclosure includes an apparatus for building a coaxial (coax) convergence layer comprising a plurality of frame buffers, a downstream frame router, wherein the downstream frame router is configured to receive downstream frames from an EPON PHY and route downstream MPCP frames and downstream data frames into different frame buffers, a MPCP translator coupled to the downstream frame router, wherein the MPCP translator is configured to translate MPCP gate frames into an uplink bandwidth allocation for a coax PHY in terms of Physical Resource Blocks (PRB) and generate Uplink-Media Allocation Plan (UL-MAP) and a PRB allocator coupled to the downstream frame router and the MPCP translator, wherein the PRB allocator is configured to allocate downlink PRBs for the downstream MPCP frames and the downstream data frames, generate Downlink-Media Allocation Plan (DL-MAP), and construct downstream coax frames for the coax PHY, wherein the downstream coax frame comprises the DL-MAP, the UL-MAP, and a data payload carrying the downstream MPCP frames and the downstream data frames.

In another embodiment, the disclosure includes a method comprising receiving a gate message from an OLT, wherein the gate message comprises a LLID, a grant start time, and a grant length, calculating an uplink symbol offset based on the grant start time, calculating an uplink symbol number based on the uplink symbol offset, searching empty PRB in the uplink symbol number in an uplink PRB table and allocating uplink PRBs to the LLID according to the grant length specified in the gate message.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
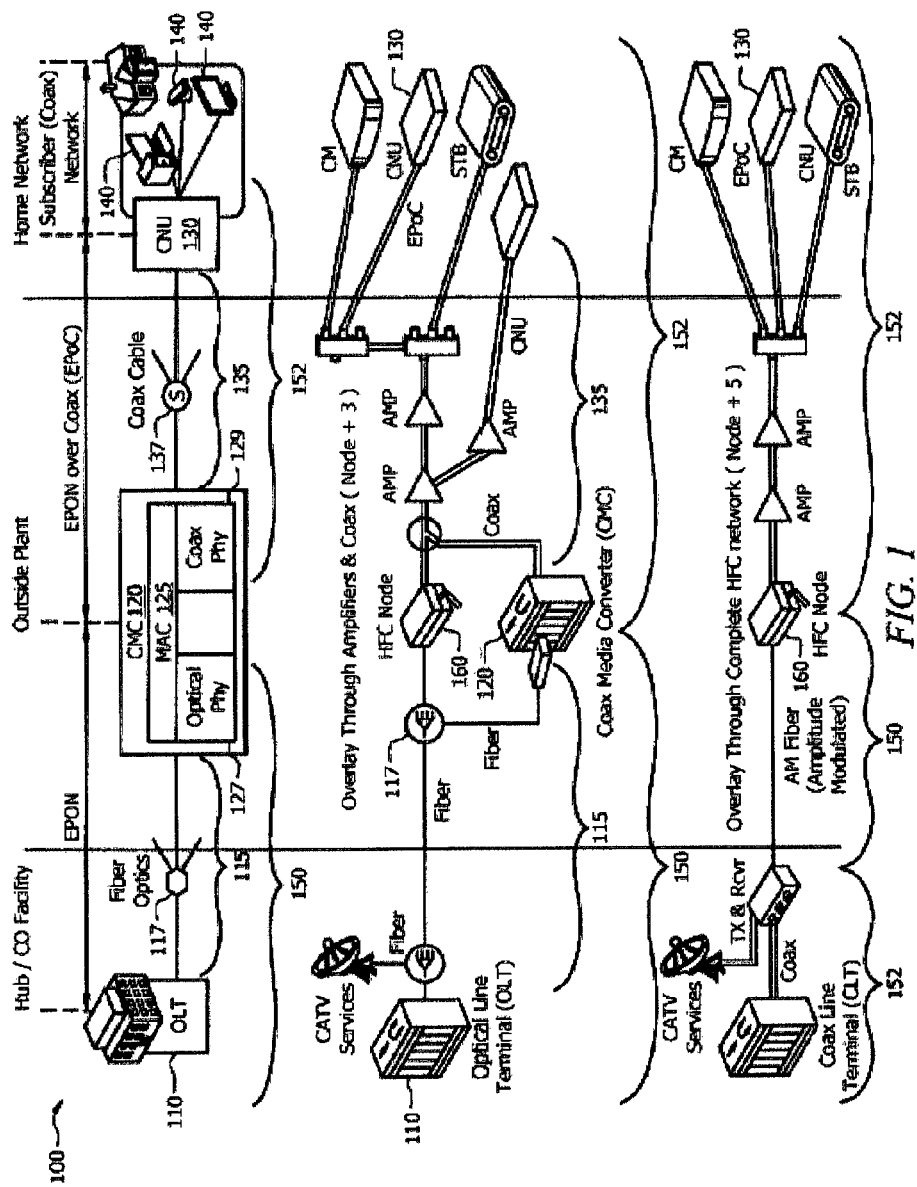
FIG. 1 is a schematic diagram of a unified optical-coaxial network according to an embodiment of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An EPoC system is a hybrid access network employing both optical and coaxial technologies. It consists of two segments: an optical segment that is essentially a PON, and a coaxial segment that is a coaxial cable network. In the PON segment, an OLT resides in the local exchange or central office where the OLT connects the EPoC access network to an Internet Protocol (IP) backbone. In the coaxial segment, CNUs may lie at the end-user locations, and each CNU typically serves three to four end users which are also known as subscribers. A Coaxial Media Converter (CMC) merges the interface between the PON segment and the coaxial segment of the network. The CMC is a single box unit that may be located where an ONU and a Coaxial Line Terminal (CLT) are fused together, typically at the curb or at the basement of an apartment building. Hence, the CMC is responsible for handling the end to end fiber to coaxial upstream and downstream transmissions, scheduling, and maintaining the QOS or SLA.

Some EPoC embodiments include a packet repeater operating in Frequency Division Duplex (FDD) mode and/or a bridge based architecture in Time Division Duplex (TDD) mode. In the packet repeater architecture, EPON frames are passed through from EPON PHY to EPoC PHY with no internal burst buffers at the CMC. Hence, this architecture cannot support burst repeater functions. In the bridge based architecture, the CMC consists of two complete MACs, an EPON MAC and an EPoC MAC where an EPoC scheduler manages the EPON to EPoC QOS or SLA. The drawbacks of this architecture are higher delay due to the two stages scheduling and higher management overhead.

Disclosed herein is a method, apparatus, and/or system for building a coaxial convergence layer in an EPoC system by extending all EPON MPCP functions from OLT to CNUs, translating EPON MPCP messages from the optical domain to specific messages for communicating with the PHY in the coax domain, forwarding packets in both upstream and downstream directions. In an embodiment, the coax portion in such a system may employ Orthogonal Frequency Division Multiple Access (OFDMA) modulation and multiplexing method to establish the communication link between the CMC and CNUs. In another embodiment, such a method may manage bandwidth allocation dynamically by translating MPCP gate messages from the OLT to Media Allocation Plan (MAP) message for the CNUs. In another embodiment, such a method may assign PRBs to LLIDs or CNUs to support multiple CNUs upstream and downstream transmissions with dynamic or predefined bit loading profile. In another embodiment, such a method may decouple the optical and coax timing domain and therefore simplify the adaptive timing adjustments when plant condition changes. In another embodiment, such a system may comprise internal burst frame buffers and hence may be employed in FDD mode with either packet repeater function or burst repeater function, or in TDD based Orthogonal Frequency Division Multiplex (OFDM) scheme.

The benefits of the disclosed systems may include the EPON MPCP signaling protocol defined in IEEE 802.3av, which can be extended to support an EPoC network with no change in EPON OLT and EPoC CNU. The disclosed systems may also support coexistence of conventional EPON ONUs and CNUs in an EPoC architecture, and EPON LLID may be used for allocating specific EPoC modulation profiles in both upstream and downstream frames.

It should be noted that in the present disclosure, the terms CMC, Fiber Coaxial Unit (FCU), Optical Coaxial converter Unit (OCU) and CLT are equivalent and may be used interchangeably.

FIG. 1 illustrates an embodiment of a unified optical-coaxial network 100 comprising an optical portion 150 and a coaxial (electrical) portion 152. The unified optical-coaxial network 100 may include an OLT 110, at least one CNU 130 coupled to a plurality of subscriber devices 140, and a CMC 120 positioned between the OLT 110 and the CNU 130, e.g., between the optical portion 150 and the coaxial portion 152. The OLT 110 may be coupled via an Optical Distribution Network (ODN) 115 to the CMCs 120, and optionally to one or more ONUs (not shown), or one or more Hybrid Fiber Coaxial (HFC) nodes 160 in the optical portion 150. The ODN 115 may comprise fiber optics and an optical splitter 117 or a cascade of 1×M passive optical splitters that couples OLT 110 to the CMC 120 and any ONUs. The value of M in EPoC, i.e., the number of CMCs, is typically 4, 8, or 16, and is decided by the operator depending on factors such as optical power budget. The CMC 120 may be coupled to the CNUs 130 via an electrical distribution network (EDN) 135, which may comprise a cable splitter 137 or a cascade of taps/splitters, or one or more amplifiers. Each OLT port can typically serves 32, 64, 128 or 256 CNUs. It should be noted that the upstream transmissions from CNUs will only reach the CMC and not the other CNUs due to the directional property of the tap. The distances between the OLT and the ONUs are in the range of 10 to 20 kilometers, and that between the CMC and CNUs are in the range of 100 to 500 meters. The unified optical-coaxial network 100 may comprise any number of HFCs 160, CMCs 120 and corresponding CNUs 130. The components of unified optical-coaxial network 100 may be arranged as shown in FIG. 1 or any other suitable arrangement.

The optical portion 150 of the unified optical-coaxial network 100 may be similar to a PON in that it may be a communications network that does not require any active components to distribute data between the OLT 110 and the CMC 120. Instead, the optical portion 150 may use the passive optical components in the ODN 115 to distribute data between the OLT 110 and the CMC 120. Examples of suitable protocols that may be implemented in the optical portion 150 include the asynchronous transfer mode PON (APON) and the broadband PON (BPON) defined by the ITU Telecommunication Standardization Sector (ITU-T) G.983 standard, Gigabit PON (GPON) defined by the ITU-T G.984 standard, the EPON defined by the IEEE 802.3ah and 802.3av standards, and the wavelength division multiplexing (WDM) PON (WDM-PON), all of which are incorporated by reference as if reproduced in their entirety.

The OLT 110 may be any device configured to communicate with the CNUs 130 via the CMC 120. The OLT 110 may act as an intermediary between the CMCs 120 or CNUs 130 and another network (not shown). The OLT 110 may forward data received from the other network to the CMCs 120 or CNUs 130 and forward data received from the CMCs 120 or CNUs 130 onto the other network. Although the specific configuration of the OLT 110 may vary depending on the type of optical protocol implemented in the optical portion 150, in an embodiment, OLT 110 may comprise an optical transmitter and an optical receiver. When the other network is using a network protocol that is different from the protocol used in the optical portion 150, OLT 110 may comprise a converter that converts the other network protocol into the optical portion 150 protocol. The OLT converter may also convert the optical portion 150 protocol into the other network protocol.

The ODN 115 may be a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the CMC 120. It should be noted that the optical fiber cables may be replaced by any optical transmission media in some embodiments. In some embodiments, the ODN 115 may comprise one or more optical amplifiers. The ODN 115 typically extends from the OLT 110 to the CMC 120 and any optional ONUs (not shown) in a branching configuration as shown in FIG. 1, but may be alternatively configured as determined by a person of ordinary skill in the art.

The CMC 120 may be any device or component configured to forward downstream data from the OLT 110 to the corresponding CNUs 130 and forward upstream data from the CNUs 130 to the OLT 110. The CMC 120 may convert the downstream and upstream data appropriately to transfer the data between the optical portion 150 and the coaxial portion 152. The data transferred over the ODN 115 may be transmitted or received in the form of optical signals, and the data transferred over the EDN 135 may be transmitted or received in the form of electrical signals that may have the same or different logical structure as compared with the optical signals. As such, the CMC 120 may encapsulate or frame the data in the optical portion 150 and the coaxial portion 152 differently. In an embodiment, the CMC 120 includes a media access control (MAC) layer 125 and physical (PHY) layers, corresponding to the type of signals carried over the respective media. The MAC layer 125 may provide addressing and channel access control services to the PHY layers. As such, the PHY may comprise an optical PHY 127 and a coaxial PHY 129. In many embodiments, the CMC 120 is transparent to the CNU 130 and OLT 110 in that the frames sent from the OLT 110 to the CNU 130 may be directly addressed to the CNU 130 (e.g. in the destination address), and vice-versa. As such, the CMC 120 intermediates between network portions, namely an optical portion 150 and a coaxial portion 152 in the example of FIG. 1. As discussed further below, an identifier may be associated with each CMC 120, and the identifier may uniquely identify the each CMC 120.

The electrical portion 152 of the unified electrical and coaxial network 100 may be similar to any known electrical communication system. The electrical portion 152 may not require any active components to distribute data between the CMC 120 and the CNU 130. Instead, the electrical portion 152 may use the passive electrical components in the electrical portion 152 to distribute data between the CMC 120 and the CNUs 130. Alternatively, the electrical portion 152 could use some active components, such as amplifiers. Examples of suitable protocols that may be implemented in the electrical portion 152 include MoCA, G.hn, HPNA, and Home Plug A/V, all of which are incorporated by reference as if reproduced in their entirety.

The EDN 135 may be a data distribution system that may comprise electrical cables (e.g. coaxial cable, twisted wires, etc.), couplers, splitters, distributors, and/or other equipment. In an embodiment, the electrical cables, couplers, splitters, distributors, and/or other equipment are passive electrical components. Specifically, the electrical cables, couplers, splitters, distributors, and/or other equipment may be components that do not require any power to distribute data signals between the CMC 120 and the CNU 130. It should be noted that the electrical cables may be replaced by any electrical transmission media in some embodiments. In some embodiments, the EDN 135 may comprise one or more electrical amplifiers. The EDN 135 typically extends from the CMC 120 to the CNU 130 in a branching configuration as shown in FIG. 1, but may be alternatively configured as determined by a person of ordinary skill in the art.

In an embodiment, the CNUs 130 may be any devices that are configured to communicate with the OLT 110, the CMC 120, and any subscriber devices 140. Specifically, the CNUs 130 may act as an intermediary between the CMC 120 and the subscriber devices 140. For instance, the CNUs 130 may forward data received from the CMC 120 to the subscriber devices 140, and forward data received from the subscriber devices 140 onto the OLT 110. Although the specific configuration of the CNUs 130 may vary depending on the type of unified optical-coaxial network 100, in an embodiment the CNUs 130 may comprise an electrical transmitter configured to send electrical signals to the CMC 120 and an electrical receiver configured to receive electrical signals from the CMC 120. Additionally, the CNUs 130 may comprise a converter that converts the electrical signal into electrical signals for the subscriber devices 140, such as signals in IEEE 802.11 wireless local area network (WiFi) protocol, and a second transmitter and/or receiver that may send and/or receive the electrical signals to the subscriber devices 140. In some embodiments, CNUs 130 and coaxial network terminals (CNTs) are similar, and thus the terms are used interchangeably herein. The CNUs 130 may be typically located at distributed locations, such as the customer premises, but may be located at other locations as well.

The subscriber devices 140 may be any devices configured to interface with a user or a user device. For example, the subscribed devices 140 may include desktop computers, laptop computers, tablets, mobile telephones, residential gateways, televisions, set-top boxes, and similar devices.

Figure 2:
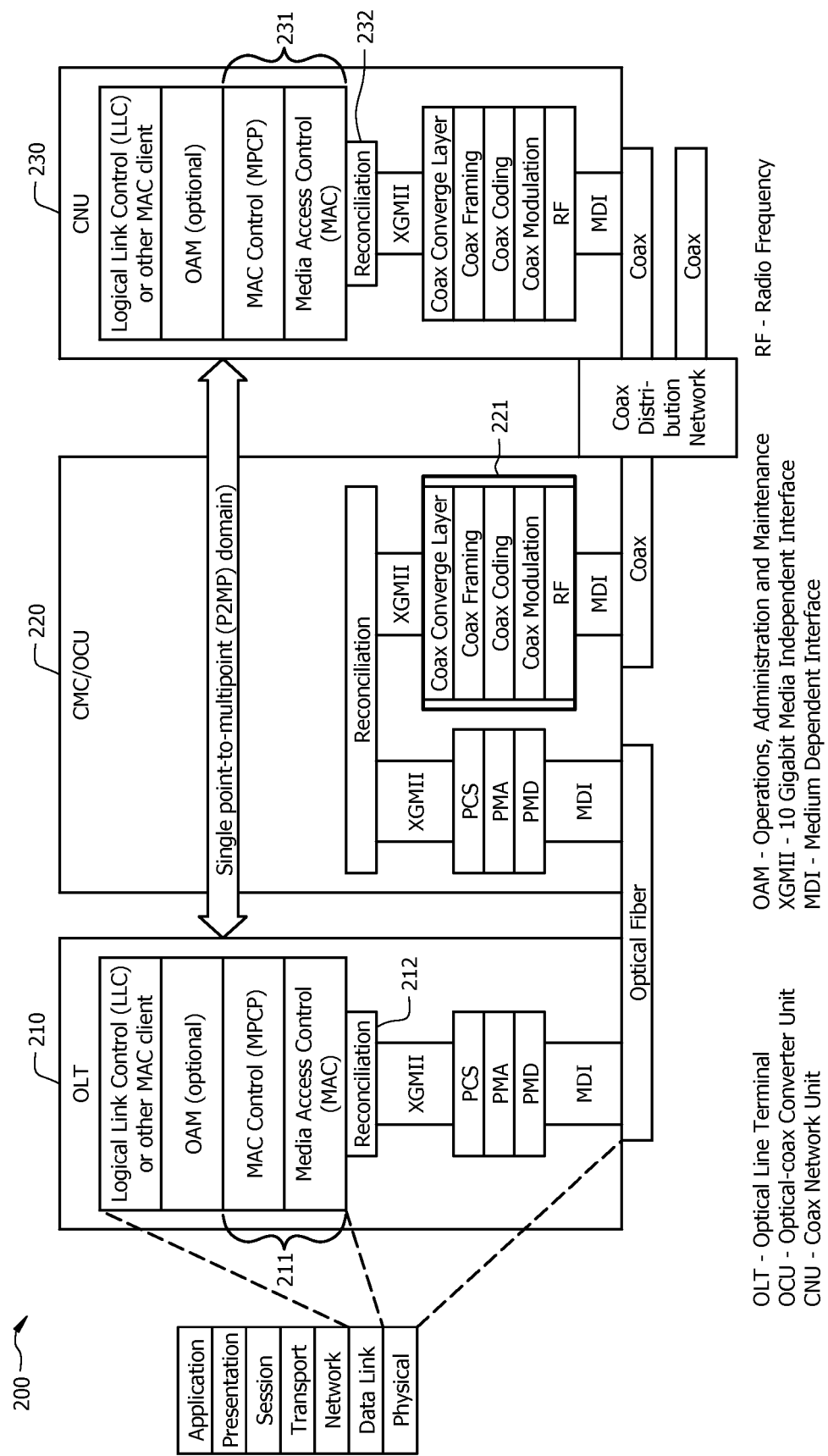
FIG. 2 is a diagram of an embodiment of the coax convergence layer protocol stack.

FIG. 2 is a diagram illustrating the proposed EPoC protocol stack 200 in an EPON OLT 210, an EPoC CMC/OCU/FCU 220, and an EPoC CNU/Coax CPE 230. The EPON MAC layer and its associated sublayers from IEEE 802.3av may be the same without any modifications for EPoC. The disclosed system, method, and apparatus introduce a coax convergence layer for EPoC PHY that can work closely with EPON MAC to complete an end-to-end transmission between EPON fiber network and EPoC coax network. Consequently, the CMC or OCU may be designed to be a PHY layer converter, which does not contain the data link layer.

Many of the elements of protocol stack 200 are as described in IEEE 802.3av, so only the differences and notable items are discussed herein. In protocol stack 200, the Ethernet MAC, the EPON MAC and the EPON MPCP as shown in 211 and 231 are used and are the same as IEEE 802.3av. All MPCP functions are extended from the OLT to the CNU with the design of the proposed coax convergence layer. For example, the EPON LLID is directly assigned to each CNU by the OLT in the same way as to an ONU. The reconciliation sublayer 212 in the OLT 210 is also the same, while the reconciliation sublayer 232 in the CNU 230 is the same as the ONUs in IEEE 802.3av. In protocol stack 200, the EPoC PHY sub-system 221 comprises a proposed coax convergence layer and a coax PHY stack, wherein the coax PHY stack further comprises a coax framing layer, a coax coding layer, a coax modulation layer and a radio frequency (RF) layer, which provides the transmission channel. The coax framing layer decomposes and assembles data packets in the coax network according to the coax PHY modulation method. The coax coding layer protects the data transmission from impairments, such as impulse noise and variations in plant conditions. The coax modulation layer modulates the data according to the coax PHY modulation method. The RF layer interfaces to an electrical medium for a coaxial network. The PHY stack also performs channel estimation, sounding, registration, ranging, and other PHY layer functions for the coax channel. The coax convergence layer acts as the mediator between the optical and the coaxial domains. MPCP control messages and Ethernet data frames are transferred between the coax convergence layer and the EPON reconciliation sub-layer. These protocol layers are also present in the CNU 230 and operate similarly.

Figure 3:
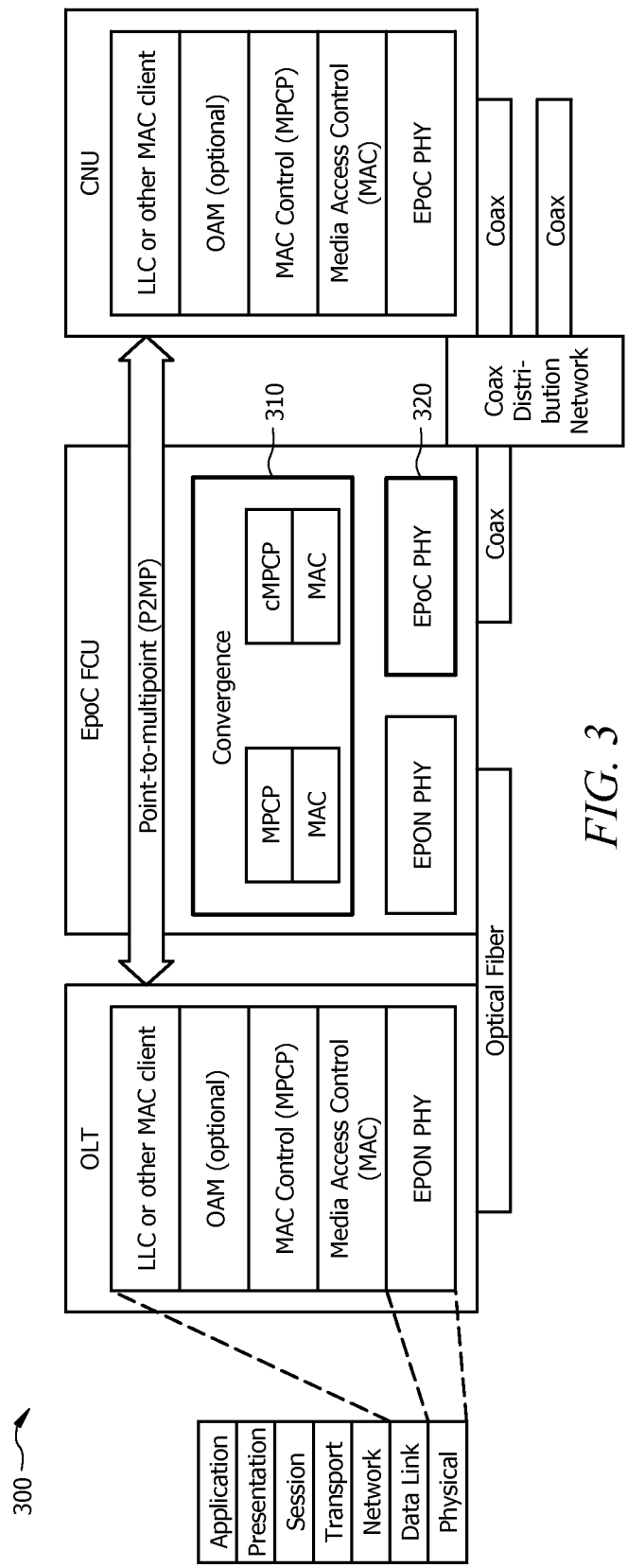
FIG. 3 is a diagram of another embodiment of the coax convergence layer protocol stack.

It should be noted that the EPoC PHY subsystem 221 may be presented in an alternative configuration where the proposed coax convergence layer may lie outside of the EPoC PHY. FIG. 3 illustrates an EPoC protocol stack 300 for such alternative configuration where the proposed coax convergence layer 310 resides outside of the EPoC PHY 320.

The main functions of the coax convergence layer in a FCU are MPCP translation and frame routing. In the EPON optical domain, bandwidth is a one-dimensional allocation based on time while in the coaxial domain, it is a two-dimensional allocation based on time and frequency which is expressed in terms of OFDM symbols and sub-carriers or PRBs. For instance, the OLT may convey uplink bandwidth allocation in EPON MPCP gate message whereas the coax PHY comprehends bandwidth allocation in terms of MAP. Coax PHY system uses UL-MAP to indicate the allocated PRBs for the uplink transmission and DL-MAP to indicate the PRBs used for the downlink transmission. Hence, the coax convergence layer translates the EPON MPCP gate message from OLT into an upstream bandwidth allocation described in an UL-MAP specifying the PRBs for the assigned LLIDs or CNUs. The convergence layer also allocates PRBs, generates DL-MAP, and converts streams of Ethernet frames into symbols for downstream transmission to CNUs. The coax convergence layer maintains and uses EPoC burst frame buffers residing in the FCU to manage incoming frames, parses the incoming Ethernet frames, and routes them into different buffers depending on whether they are MPCP frames or data frames. The convergence layer may operate in either packet repeater mode or burst repeater mode. The coax convergence layer may also translate EPON polling messages to the coax polling message which can be understood by the CNU and generate MPCP messages for its own self-management. Another main function of the coax convergence layer is to establish and maintain the physical connection between the CMC and CNU. This may include CNU random access, rate adaptation and so forth.

Figure 4:
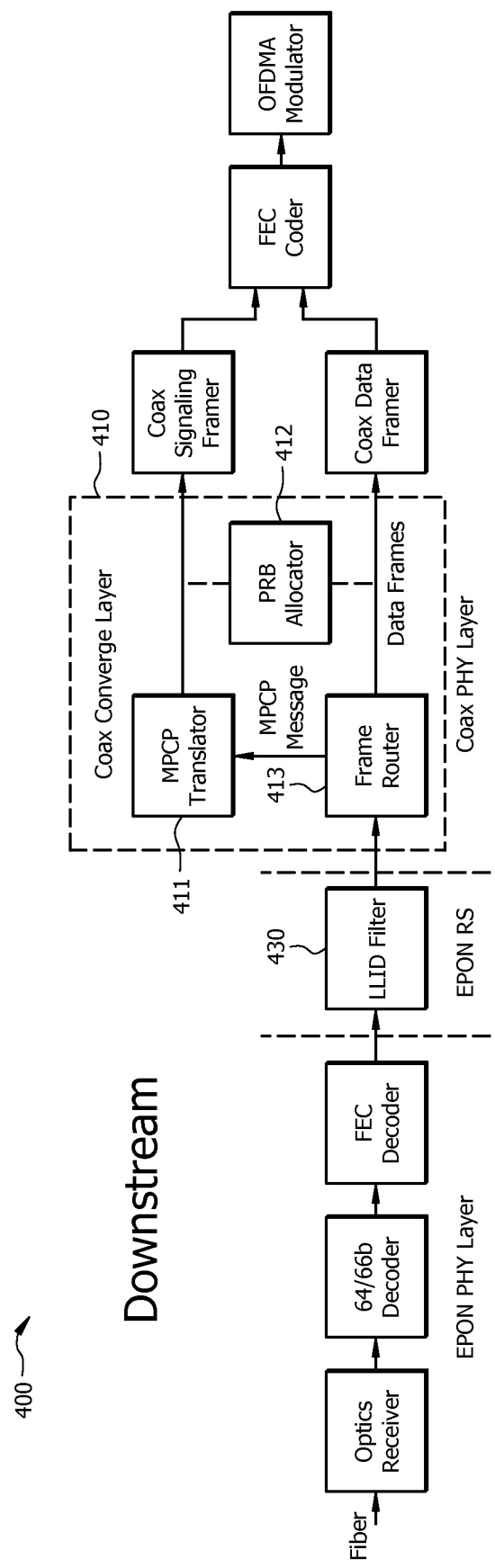
FIG. 4 is a schematic diagram of an embodiment of the downstream communications in the coaxial convergence layer.

FIG. 4 illustrates the modules associated with the FCU coax convergence layer in the context of downstream communications 400. For downstream transmission, the FCU receives data packets from the OLT over EPON PHY. In the FCU, the EPON reconciliation sublayer (RS) comprises a LLID filter 430 which filters the LLIDs of the incoming data packets from EPON PHY. If the LLIDs are assigned to the connected CNUs in the coax domain covered by the FCU, the data packets will be forwarded to the downstream coax convergence layer 410 and transmitted to the coax network, otherwise the data packets will be dropped. The downstream coax convergence layer 410 comprises a frame router 413, a MPCP translator 411 and a PRB allocator 412. The frame router 413 routes MPCP frames and data frames to different frame buffers. The MPCP translator 411 allocates PRBs for uplink transmission based on the gate window granted in the MPCP gate message and generates UL-MAP for the coax PHY. The PRB allocator 412 allocates PRBs, generates DL-MAP, and constructs downstream frames for transmission to coax PHY.

Figure 5:
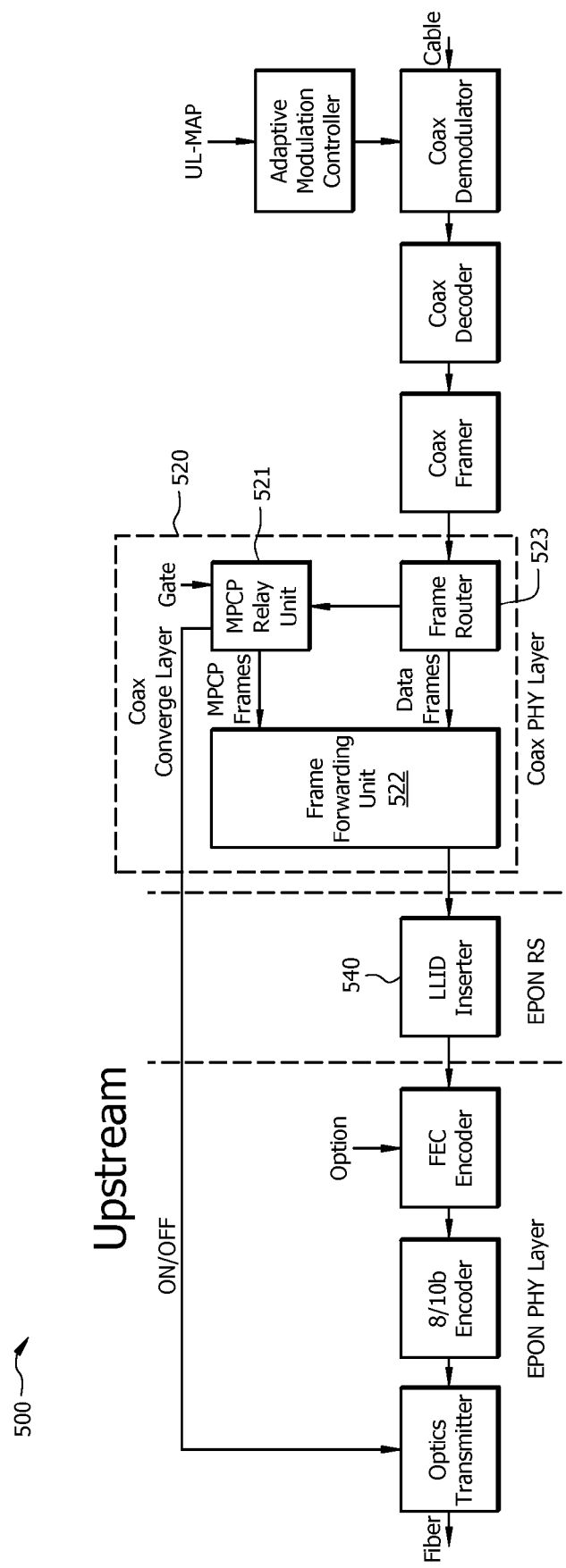
FIG. 5 is a schematic diagram of an embodiment of the upstream communications in the coaxial convergence layer.

FIG. 5 illustrates the modules associated with the FCU coax convergence layer in the context of upstream communications 500. For upstream transmission, FCU receives data packets from CNUs over EPoC PHY. The upstream coax convergence layer 520 comprises a frame router 523, a MPCP relay unit 521 and a frame forwarding unit 522. The frame router 523 routes MPCP frames and data frames to different frame buffers. The MPCP relay unit 521 relays the incoming MPCP frames to the frame forwarding unit 522 and controls the on/off of the gate for transmission window at the allocated time based on the MPCP gate message. The frame forwarding unit 522 forwards the MPCP frames and the data frames to the EPON RS 540, which in turn forwards the data packets to EPON PHY transparently without additional processes except for inserting LLIDs. It should be noted that the coax convergence layer 410 and 520 may reside outside of the coax PHY.

Figure 6:
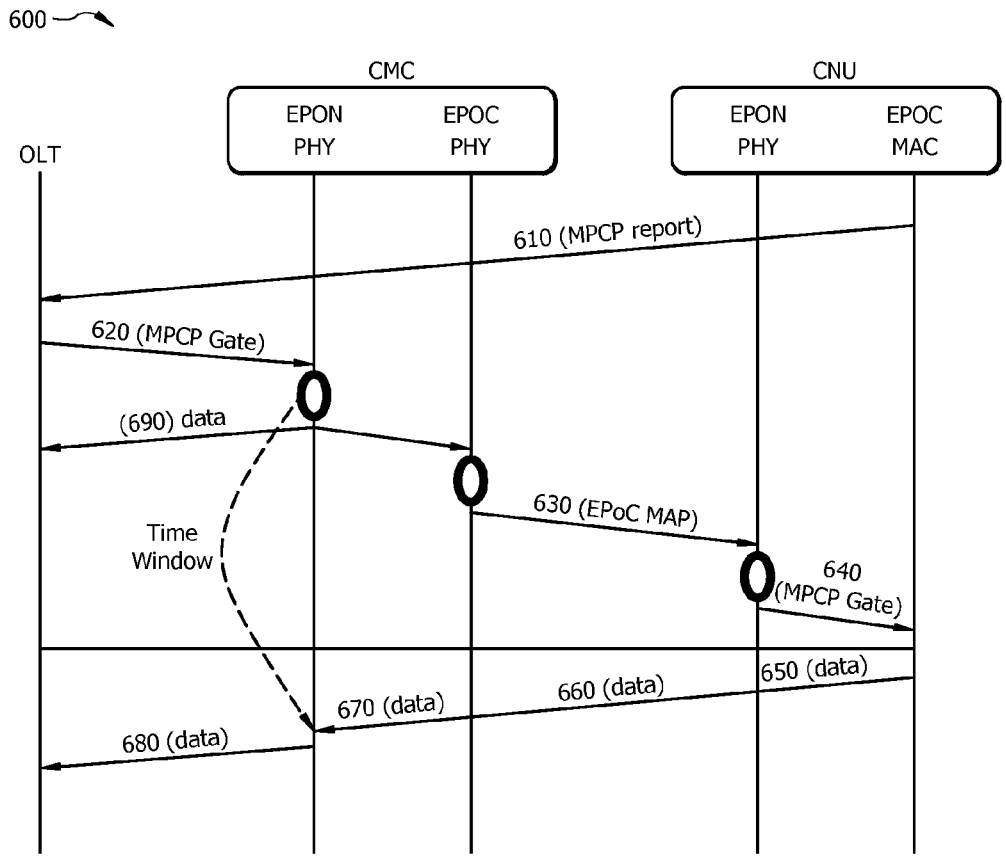
FIG. 6 is a protocol diagram of an embodiment of a method for upstream data processing in an EPoC network.

FIG. 6 is a protocol diagram of an embodiment of a method 600 for upstream data processing between an OLT, a CMC and a CNU in an EPoC network. At step 610, the CNU EPON MAC requests for bandwidth by generating a MPCP report message and transmits the MPCP report message to the OLT. At step 620, the OLT responds by sending a MPCP gate message to the CMC. At step 630, the CMC coax convergence layer receives the MPCP gate message, translates it from a one dimensional time slot into a two dimensional time and frequency allocation described as an EPoC MAP message (see FIG. 7 description) and transmits the EPoC MAP message to the CNU. At step 640, the CNU receives the MPCP gate message and immediately sends data to the EPoC PHY at step 650. At step 660, the CNU EPoC PHY transmits the data to the CMC according to the allocated PRBs indicated in the UL-MAP. At step 670, the CMC EPoC PHY receives and demodulates the data according to the UL-MAP, re-constructs the Ethernet frames in the coax framing layer and sends the Ethernet frames to the EPON PHY. At step 680, the CMC transmits the Ethernet frames to the OLT according to the optic timing window specified in the MPCP gate message received at step 620.

It should be noted that there are two methods to send data from the CMC to the OLT in the fiber segment of the network. In the first method, all CNUs share the time window assigned by the MPCP gate message. Hence, the CMC may transmit data immediately when the optical time window is opened as shown in step 690. The second method is to have a dedicated optical time window for each CNU which is given in the example above and shown in step 680.

Figure 7:
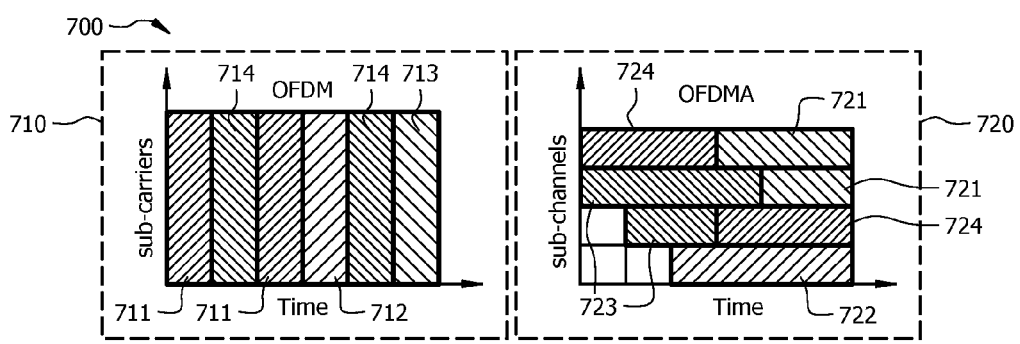
FIG. 7 is a schematic diagram of an embodiment of a coaxial Media Allocation Plan (MAP) structure.

FIG. 7 is a schematic diagram of an embodiment of a coaxial MAP structure 700 with resource blocks expressed in terms of symbols in time in the x-axis and sub-carriers in frequency in the y-axis. The coax MAP structure 700 illustrates two schemes, an OFDM MAP structure 710 where each individual allocation 711, 712, 713, 714 indicate the allocated time-frequency slots for a specific LLID or CNU, and an OFDMA MAP structure 720 where each individual allocation 721, 722, 723, 724 indicates the allocated time-frequency slots for a specific LLID or CNU. In the disclosed system, the coax PHY may employ OFDMA scheme for both upstream and downstream transmissions.

As illustrated in structure 700, a coax allocation MAP may be used to support multiple users by multiplexing timeslots in the physical channels statistically. It may also be used to balance the load in multiple physical radio channels and to ensure reasonable network traffic by reserving some dedicated upstream resources and allocating other upstream/downstream resources dynamically. It may also be used to adapt to the changes in the upstream and downstream network traffic by dynamically adjusting the ratio between the upstream and downstream allocations.

In upstream, the main MAC function is dynamic bandwidth allocation where the OLT allocates bandwidth in terms of timeslots, or bytes specified in an EPON gated window and the CMC/OCU translates this bandwidth allocation into a coax UL-MAP for the CNU.

In downstream, packets are broadcasted by the OLT and selectively forwarded by the CMC. The CMC buffers Ethernet frames received from the OLT into LLID-queues corresponding to their LLIDs, allocates resource in terms of time-frequency slots or PRBs specified in a DL-MAP, fragments the Ethernet frames to fit into fixed-length coax symbols or PRBs, and then transmits the fragments to the CNUs through coax Orthogonal Frequency Division Multiplexed (OFDM) symbols. A DL-MAP may store allocation for multiple LLIDs or CNUs where each LLID or CNU has a different allocation. It should be noted that a CNU may comprise one or more unique LLIDs.

Figure 8:
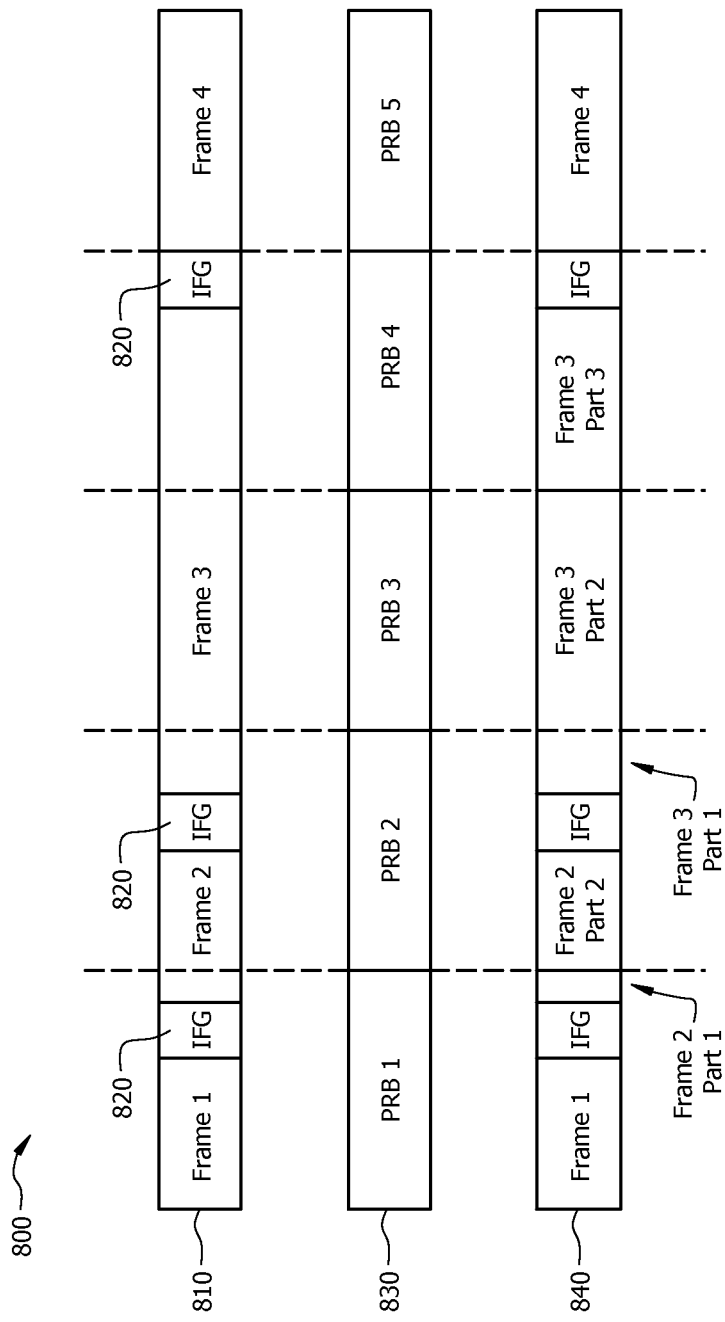
FIG. 8 is a schematic diagram of an embodiment of the fragmentation of a stream of Ethernet frames into fixed-length PRBs.

FIG. 8 illustrates a scenario 800 where a stream of Ethernet frames from EPON PHY is fragmented to fill into the allocated PRBs for coax PHY. The stream of Ethernet frames is received from the EPON PHY with a bit-stream based transmission channel and they are to be converted and forwarded to the coaxial cable with a symbol-based transmission channel. In the coax segment, a symbol denotes an OFDM symbol with a typical duration of 8 microseconds. Each symbol may be divided into multiple PRBs where each PRB is formed by a group of sub-carriers. Each symbol in a downstream frame may carry data for multiple CNUs. That is, each group of sub-carriers in a symbol may carry data for a different CNU. This allocation of PRBs to CNUs is specified in a DL-MAP. The number of bits that can be loaded in an allocation for a CNU may be determined by the modulation profile of each sub-carrier in a symbol, the number of sub-carriers in each sub-carrier group, the number of sub-carrier groups assigned which in turns depends on the maximum number of CNUs that has data for the symbol simultaneously.

For instance, a sub-carrier group G is allocated to a specific LLID for data transmission. It has $S_G$ sub-carriers and each sub-carrier is modulated with a p bits-per-symbol modulation (e.g. q-QAM employs $\log_2 q$ bits-per-symbol), then the PRB with $S_G$ sub-carriers can send data with size of $(S_G \times p)/8$ bytes. However, if the sub-carriers within the same sub-carrier group G are modulated using different modulation profiles, then the size of the PRB may be determined by accumulating the number of bits per sub-carrier in the sub-carrier group G. For example, if a set U represents sub-carriers assigned to a CNU, then the size of its PRB is given by $\Sigma_{c \in U} b(c)$ bits, where b(c) represents number of bits per sub-carrier in a symbol.

In scenario 800, the Ethernet frames view is given in 810 where a stream of four Ethernet frames is received with Inter-Frame Gap (IFG) 820 acting as frame delimiters. In the PRBs view 830, there are five PRBs allocated for this transmission. In the fragmentation view 840, the four Ethernet frames are fragmented to fit into the five allocated PRBs.

For downstream transmissions, the coax convergence layer queues the received Ethernet frames in internal frame buffers according to the LLID indicated in the frame preamble. Next, the coax convergence layer fragments the stream into pieces to fit into the PRBs and constructs the downstream OFDMA frame accordingly. When the CNU receives the downstream OFDMA frame, the coax convergence layer concatenates the PRBs, and then recovers and reconstructs each individual Ethernet frame using the IFG delimiters. It should be noted that since OFDMA is used for both upstream and downstream transmissions, the frame structure for both upstream and downstream in coax channel will be similar where the stream of Ethernet frames is fragmented into PRBs.

Figure 9:
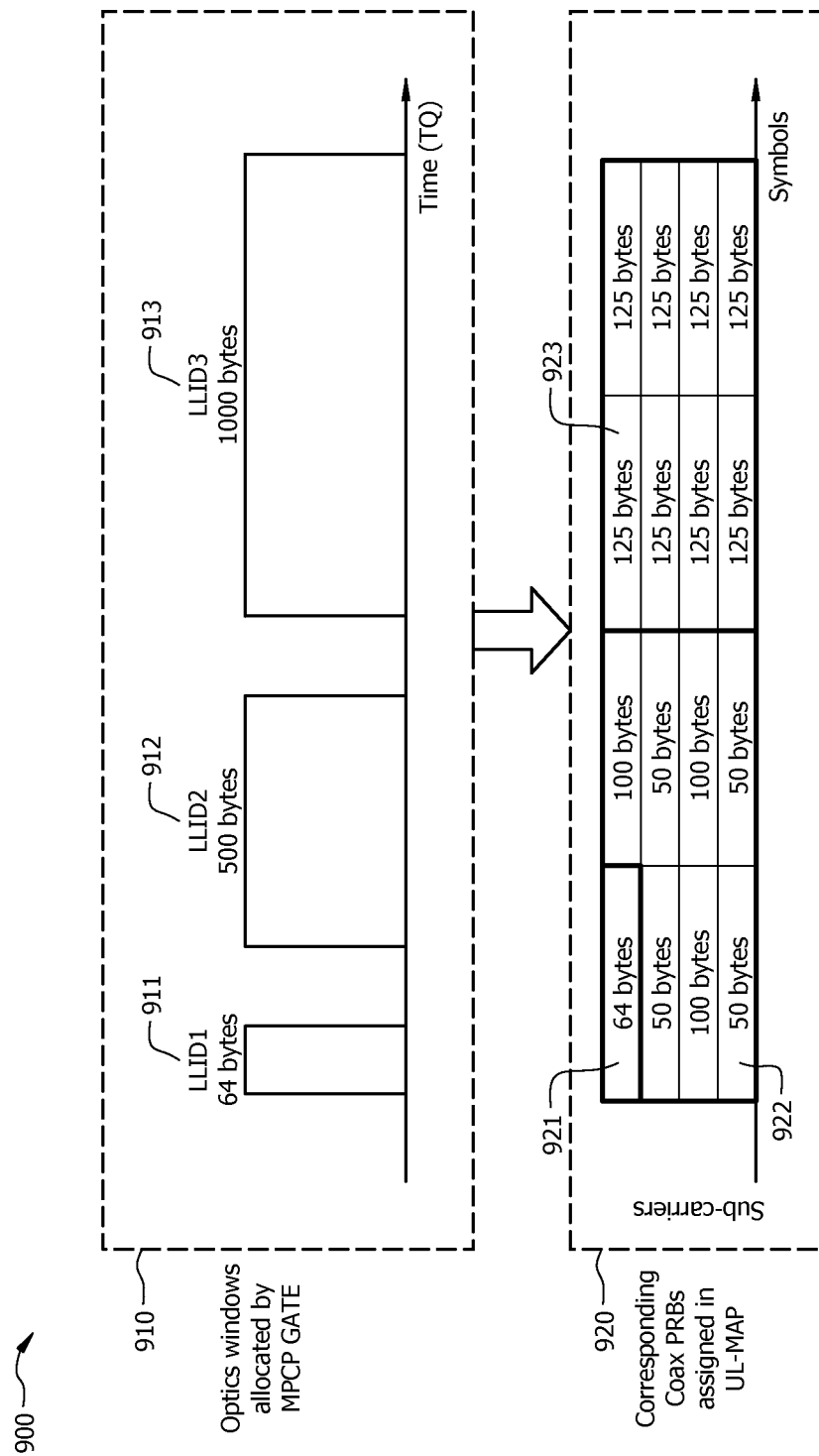
FIG. 9 illustrates the conversion from gate message to UL-MAP according to an embodiment on the disclosure.

FIG. 9 illustrates a scenario 900 where the OLT allocated MPCP gate in optics windows for three LLIDs or CNUs and the allocation is converted to a UL-MAP for CNUs. The OLT allocates bandwidth in terms of gated window which is expressed in optics Time Quanta (TQ). The CNU transmits data in terms of OFDM symbol where a symbol may consist of multiple PRBs and a CNU may use multiple PRBs in a symbol. Hence, the CMC/OCU may translate the gated window from the OLT into an upstream allocation specified in a UL-MAP for the CNU to transmit. The UL-MAP may specify the symbol number and the number of PRBs for a specific LLID or CNU. In scenario 900, the optics windows allocated by the MPCP gate allocation is shown in 910 where LLID1 911 is allocated a length of 64 bytes, LLID2 912 is allocated a length of 500 bytes and LLID3 913 is allocated a length of 1,000 bytes. The MPCP gate allocation is converted to a UL-MAP in 920 where LLID 1 is converted to a single PRB 921, LLID2 is converted to seven PRBs with length of 50 or 100 bytes in 922 and LLID3 is converted to eight PRBs with 125 bytes each in 923.

Figure 10:
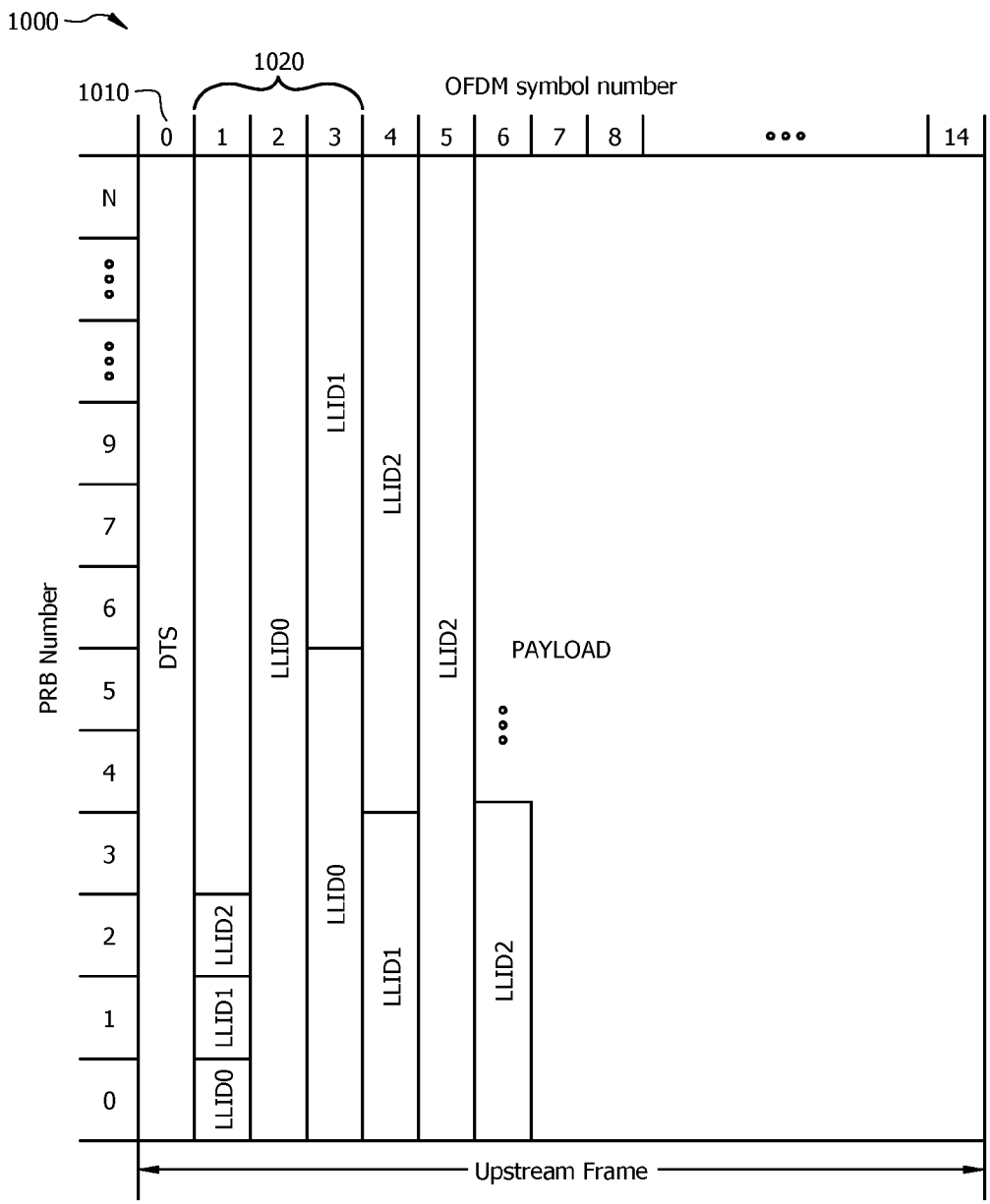
FIG. 10 is a schematic diagram of an embodiment of allocations in a coaxial upstream frame.

FIG. 10 illustrates an embodiment of allocations in a coax upstream frame 1000. A frame comprises 75 symbols with symbol number varying from 0 to 74. Consequently, the symbol counter in the CMC and CNU is a cyclic counter which counts symbols from 0 to 74. Each symbol comprises multiple PRBs with PRB number varying from 0 to N. The value N is 15 for a 24 megahertz (MHz) channel with 16 PRBs and the value N is 79 for a 120 MHz channel with 80 PRBs. Thus, there are 75*(N+1) PRBs in one upstream frame. All the PRBs are used to transmit data and each PRB may be allocated to a different CNU. For example, in the upstream frame 1000, each PRB in symbol 0 is allocated to a different LLID as shown in 1010, while in symbols 1, 2, 3, and 4, contiguous PRBs are allocated to one LLID as shown in 1020.

Figure 11:
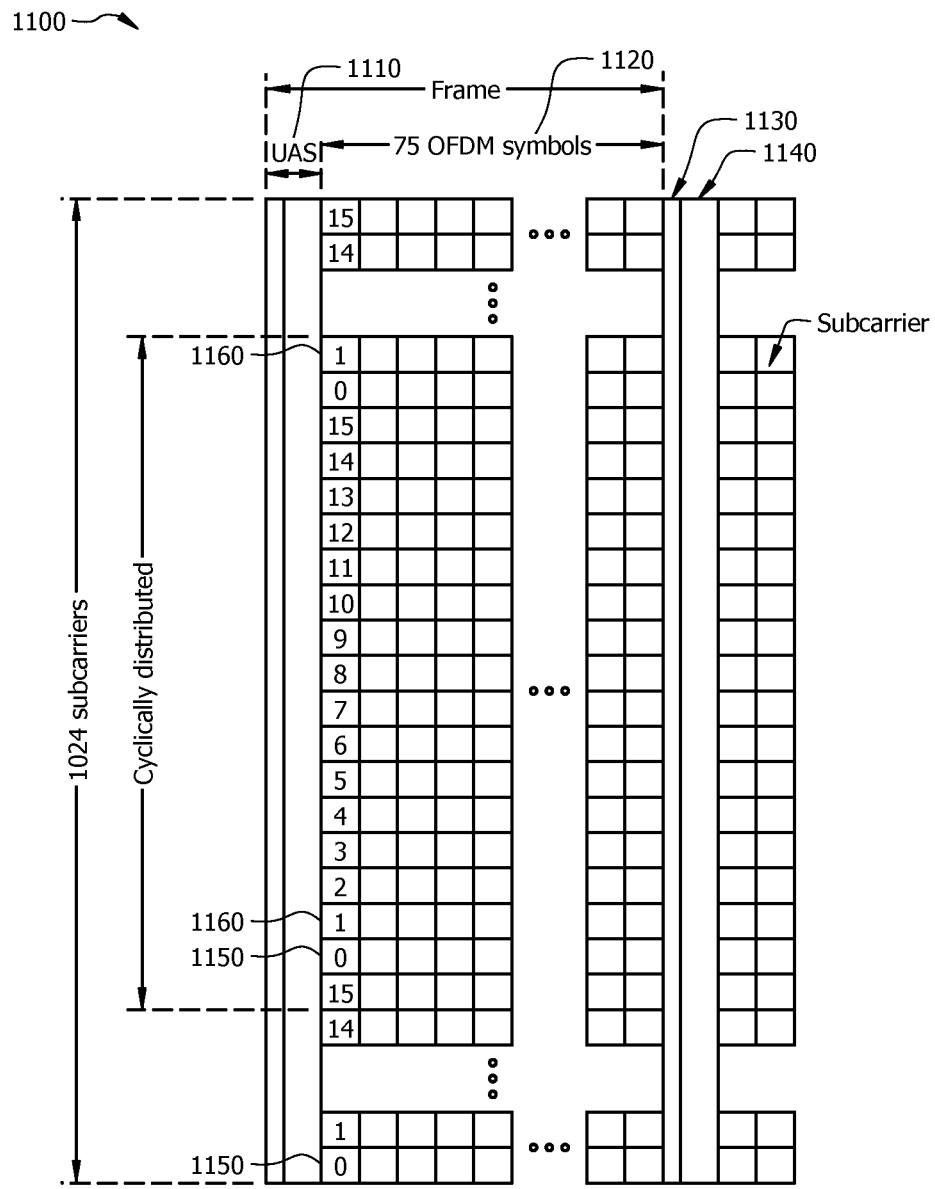
FIG. 11 is a schematic diagram of an embodiment of an EPoC PHY upstream frame format.

FIG. 11 illustrates an embodiment of an exemplary coax PHY upstream frame format 1100 for a 24 MHz OFDM channel. Each upstream frame includes an Upstream Access Sequence (UAS) 1110 and 75 payload symbols 1120. There are two sequences in UAS 1110, a first sequence UAS1 1130 and a second sequence UAS2 1140. UAS1 1130 is a known Pseudo-random Noise (PN) sequence and may be 1 or 32 OFDM symbols in length. UAS2 1140 is a training sequence modulated with Quadrature Phase Shift Keying (QPSK) where the length is 1 OFDM symbol plus Cyclic Prefix (CP) similar to a payload symbol. UAS2 1140 may act as a Guard Period (GP2) once every 50 frames. Each payload symbol comprises 1024 sub-carriers with 16 PRBs where each PRB comprises 64 discrete sub-carriers. There is no pilot in the upstream frame. Random access may be performed during UAS1, timing advance may be performed during UAS2, channel estimation and tracking may be performed during UAS2, and frequency domain equalization and decision error may be performed during UAS2 as well as payload symbols.

It should be noted that in the frame 1100 as illustrated, PRB0 1150 occupies subcarrier n*16 and PRB1 1160 occupies subcarrier n*16+1 where n varies from 0 to 64 for each PRB. This property is good for channel estimation and tracking and therefore no pilot is needed.

A UL-MAP is used for describing a two-dimensional upstream allocation consisting of two entities, a symbol number varying between 0 to 74 and a PRB number varying between 0 and N. A simple algorithm for converting a gate granted in a MPCP gate message to a UL-MAP is described in the following pseudo code:

```
OPTICS_TIMER, SYM_COUNTER              ; clocks at CMC
T_sym, bits_per_TQ, num_PRB            ; system constants
bits_per_PRB[LLID]                     ; dynamic plant conditions
GATE = {LLID, startTime, length}       ; format of optics GATE message
UL_MAP[SYM_NO][PRB_NO]                 ; format of UL-MAP
x = (GATE.startTime – OPTICS_TIMER) / T_sym  ; get the symbol offset
sym_no = (SYM_COUNTER + x) % 75        ; point to right symbol
needed = GATE.length * bits_per_TQ     ; get grant size
for (i = 0; UL_MAP[sym_no][i] != 0; i = i + 1)  ; find empty PRB in symbol
end for
while (needed > 0)                     ; allocate PRBs for entire grant
    UL_MAP[sym_no][i] = GATE.LLID      ; allocate PRB to LLID
    needed = needed – bits_per_PRB[LLID]
end while
```

Figure 12:
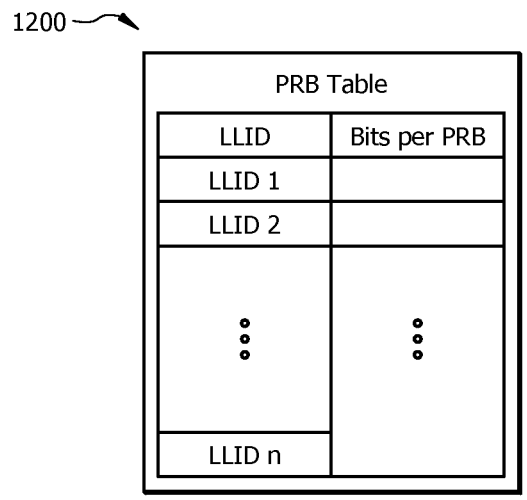
FIG. 12 is a table of an embodiment of a PRB table.

The algorithm uses system parameters such as the current values of the optics clock (OPTICS_TIMER) and the symbol counter (SYM_COUNTER) at the CMC/OCU, as well as the symbol duration in time (T_sym), number of bits carry in a TQ (bits_per_TQ) and the number of PRBs in a symbol (num_PRB). A PRB table 1200 may be used to track the number of bits per PRB for each LLID as illustrated in FIG. 12. It should be noted that the number of bits may change dynamically as the coax plant conditions vary depending on factors such as signal-to-noise ratio (SNR), bit error rate (ER), etc. A GATE is defined by the triplet {LLID, start time, length} which specify the allocation for a LLID with a start time and a length in TQs. The UL-MAP is a two-dimensional data structure consisting of PRB number and symbol number.

Figure 13:
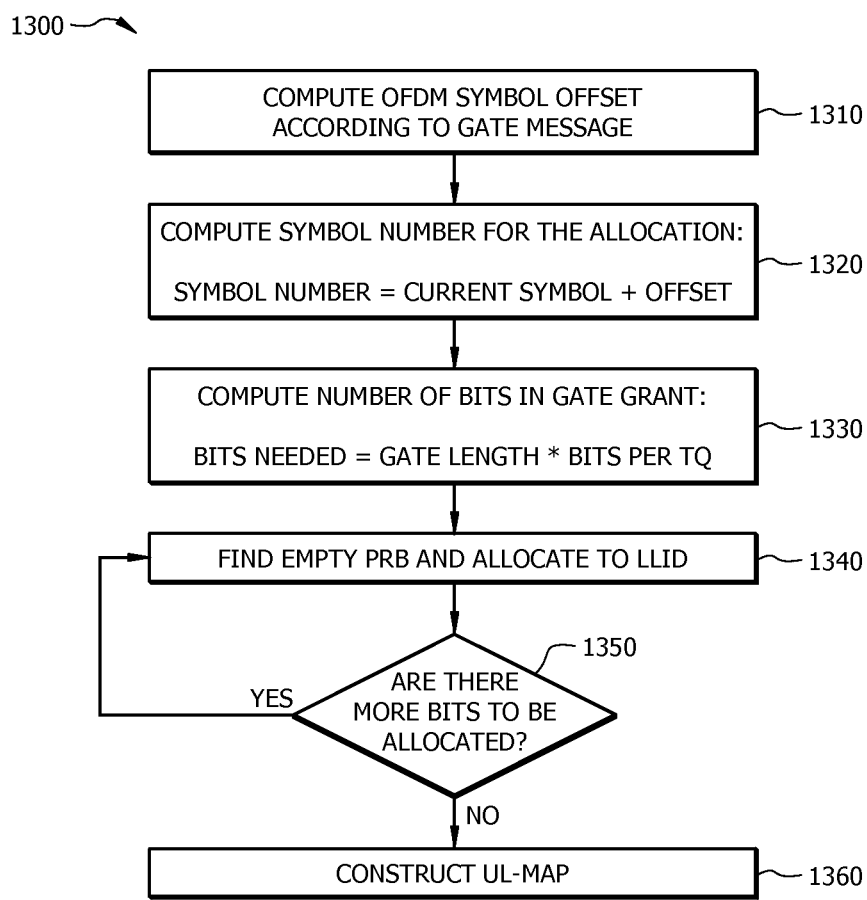
FIG. 13 is a flowchart of an embodiment of a gate translation method.

FIG. 13 illustrates an embodiment of a gate translation method 1300, which may be implemented on a CMC 120 and/or on a network element such as network element 1700 and/or network element component such as the MPCP gate translation module 1732. At step 1310, method 1300 computes the symbol offset for the allocation by calculating the time duration between present time and the future GATE start time specified in the grant and then scaling it according to the duration of a symbol. This is done so that buffering at the CMC may be kept to a minimum and the GATE opens within a symbol time of receiving upstream data at the CMC. Next at step 1320, method 1300 computes the symbol number where the upstream allocation begins by adding the offset to the current value of the symbol counter. Next at step 1330, method 1300 computes the number of bits in the GATE granted by multiplying the GATE length with the bits per TQ. Next at step 1340, method 1300 searches for empty PRB and allocates to LLID. The loop in step 1340 to 1350 should be continued until all the bits needed as computed in step 1330 are allocated. Finally, at step 1360, the UL-MAP is constructed according to the allocated PRBs.

In EPoC downstream transmissions, the OLT sends a stream of Ethernet frames downstream to the CMC/OCU in the optical fiber in a bit-stream fashion, and the CMC/OCU may forward them to the CNUs in the coaxial cables in symbol-based fashion. Hence, the CMC may pack the received Ethernet frames into Coax PRBs and generate a DL-MAP indicating a specific set of PRBs carrying data for a specific LLID or CNU.

Figure 14:
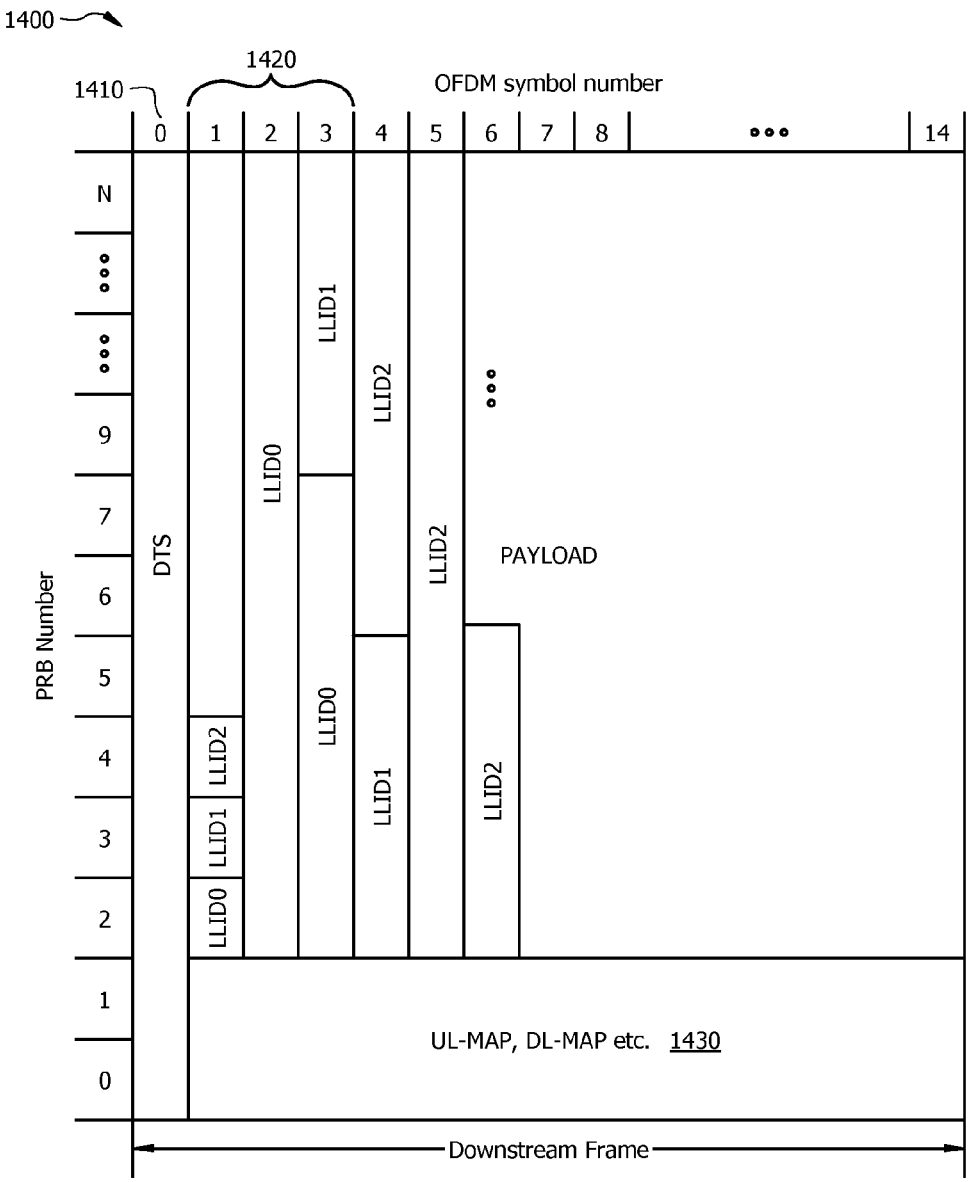
FIG. 14 is a schematic diagram of an embodiment of allocations in a coaxial downstream frame.

FIG. 14 illustrates an embodiment of a coax downstream frame structure 1400. A frame comprises 75 symbols with symbol number varying from 0 to 74. Each symbol comprises multiple PRBs with PRB number varying from 0 to N. The value N is 15 for a 24 megahertz (MHz) channel with 16 PRBs and the value N is 79 for a 120 MHz channel with 80 PRBs. Thus, there are 75*(N+1) PRBs in one downstream frame. All the PRBs are used to transmit data. Each PRB may be allocated to a different CNU. For example, in the downstream frame 1400, each PRB in symbol 0 is allocated to a different LLID as shown in 1410, while in symbols 1, 2, and 3, contiguous PRBs are allocated to one LLID as shown in 1420. The first two PRBs in all payload symbols are used for control channels such as UL-MAP, DL-MAP and other control signaling as shown in 1430. They are modulated and coded in a predefined modulation order and coding parameters.

Figure 15:
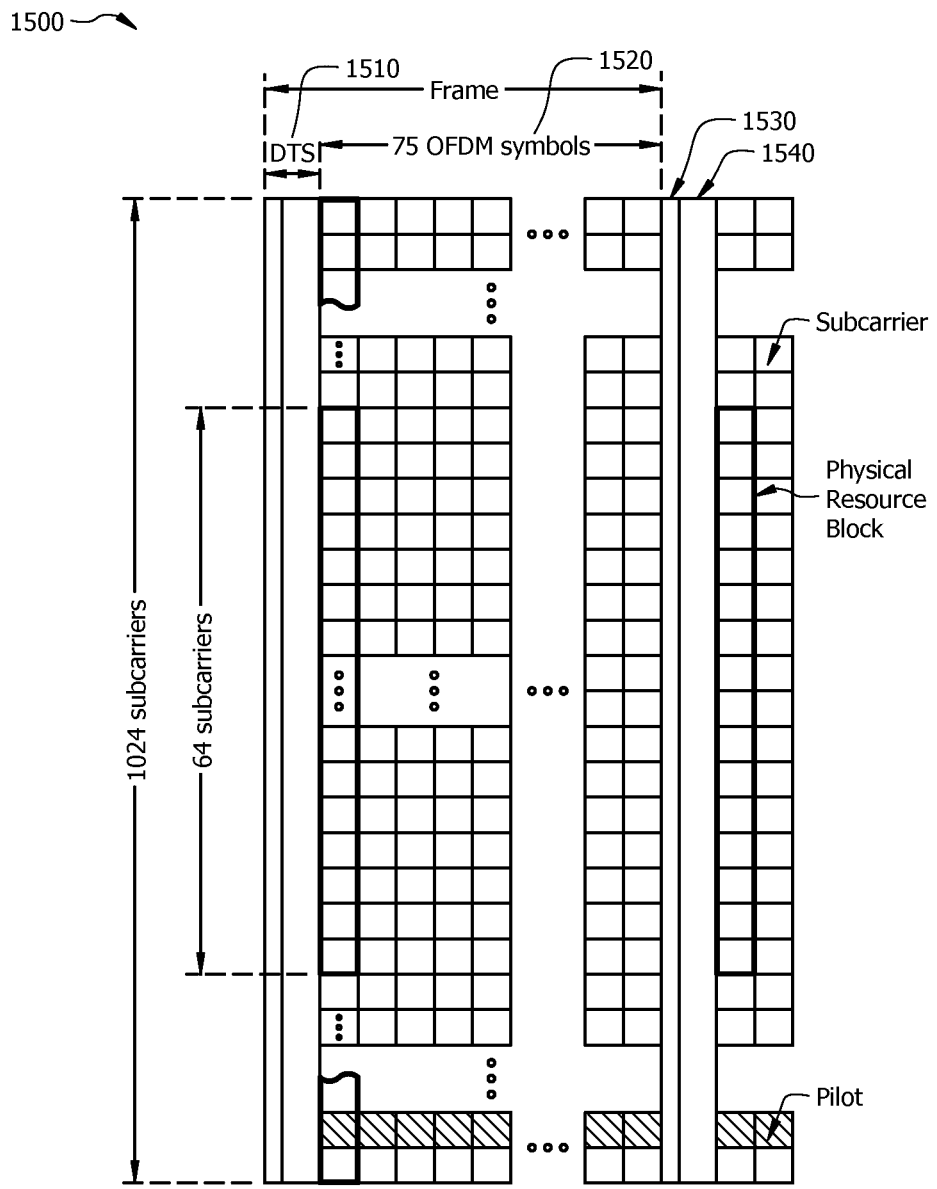
FIG. 15 is a schematic diagram of an embodiment of an EPoC PHY downstream frame format.

FIG. 15 illustrates an embodiment of an exemplary coax PHY downstream frame format 1500 for a 24 MHz OFDM channel. Each downstream frame includes a Downstream Training Sequence (DTS) 1510 and 75 payload symbols 1520. There are two sequences in DTS 1510, a first sequence DTS1 1530 and a second sequence DTS2 1540. DTS1 1530 is a Zadoff-Chu (ZC) sequence and may be 1 or 32 OFDM symbols in length. DTS2 1540 is a ZC sequence of 1 OFDM symbol plus CP in length. Each payload symbol comprises 1024 sub-carriers with 16 continuous PRBs where each PRB comprises 64 continuous sub-carriers. In a downstream frame, there are pilots located in the PRB which are specified in a DL-MAP. There may be 1 to 2 pilot sub-carriers in a 24 MHz OFDM channel and 1 to 2 pilot sub-carriers in a 120 MHz OFDM channel where channel bonding may be present. Symbol alignment may be performed during DTS1, frequency offset estimation and compensation may be performed during DTS2, sampling clock synchronization may be performed during DTS2 or pilot sub-carriers, channel estimation and tracking may be performed during DTS2 and payload symbols.

In EPoC coax PHY, each subcarrier or PRB in an OFDM symbol may be loaded with a different modulation profile either predefined or dynamically adjusted according to the signal and SNR measured in the cable plant. Hence, multiple sub-carriers or PRBs may carry multiple modulation profiles when communicating between CMC/OCU and CNUs and each of the PRB may be assigned to a specific LLID or CNU. An EPoC modulation profile or bit loading table is typically used to track the modulation used in each sub-carrier or PRB as illustrated below:

| EPoC Coax Upstream | EPoC Coax Downstream |
|---|---|
| QPSK | QPSK |
| 8 QAM | 8 QAM |
| 16 QAM | 16 QAM |
| 32 QAM | 32 QAM |
| 64 QAM | 64 QAM |
| 128 QAM | 128 QAM |
| 256 QAM | 256 QAM |
| 512 QAM | 512 QAM |
| 1024 QAM | 1024 QAM |
| 2048 QAM | 2048 QAM |
| 4096 QAM | 4096 QAM |

A DL-MAP is used for describing a two-dimensional upstream allocation consisting of two entities, a symbol number varying between 0 to 74 and a PRB number varying between 0 and N. Each PRB is allocated to one CNU when transmitting downstream. It should be noted that the number of bits carried in a PRB may vary depending on the modulation used for the sub-carriers. A simple algorithm for generating a DL-MAP for a stream of Ethernet frames is described in the pseudo code below:

The algorithm uses system parameters such as the current values of the downstream symbol counter (DSYM_COUNTER) at the CMC, and the number of PRBs in a symbol (num_PRB). A PRB table may be used to track the number of bits per PRB for each LLID. A PRB table contains information regarding the bits per PRB for each LLID in the same way as described in PRB table 1200 where the number of bits may change dynamically as the coax plant conditions vary depending on factors such as signal-to-noise ratio (SNR), bit error rate (ER), etc.

Figure 16:
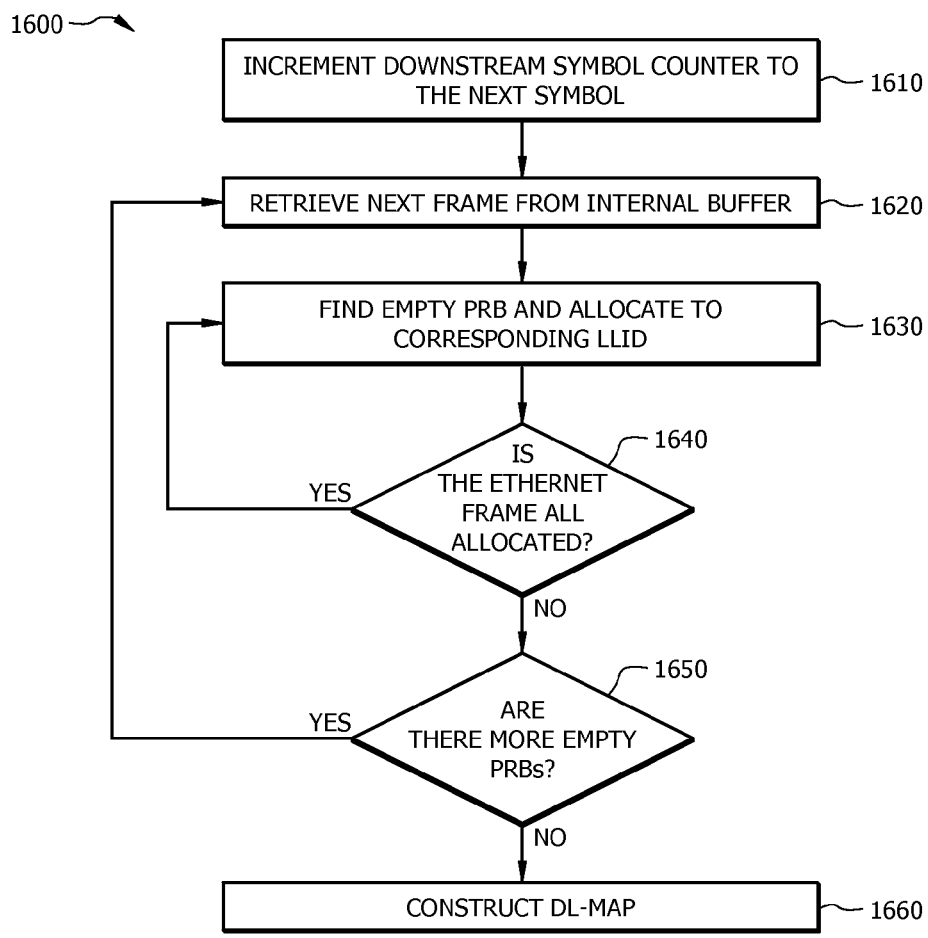
FIG. 16 is a flowchart of an embodiment of a DL-MAP generation method.

FIG. 16 illustrates an embodiment of a DL-MAP generation method 1600, which may be implemented on a CMC 120 and/or on a network element such as network element 1700 and/or network element component such as the DL-MAP generation module 1733. The DL-MAP specifies the resources used for carrying the data in a coax downstream frame. At step 1610, method 1600 increments the downstream symbol counter to point to the next downstream symbol. Next at step 1620, method 1600 retrieves the next frame from the internal frame buffer which is queued based on LLIDs. Next at step 1630, method 1600 searches for empty PRB and allocates the PRB to the corresponding LLID. The loop in steps 1630 and 1640 should be continued until the length of the Ethernet frame is allocated. Once the allocation for the Ethernet frame is completed, the loop in steps 1620 to 1650 may be repeated for the next Ethernet frame in the buffer until all PRBs are exhausted. Finally, at step 1660, method 1600 constructs the DL-MAP according to the PRBs allocated to the LLID.

Figure 17:
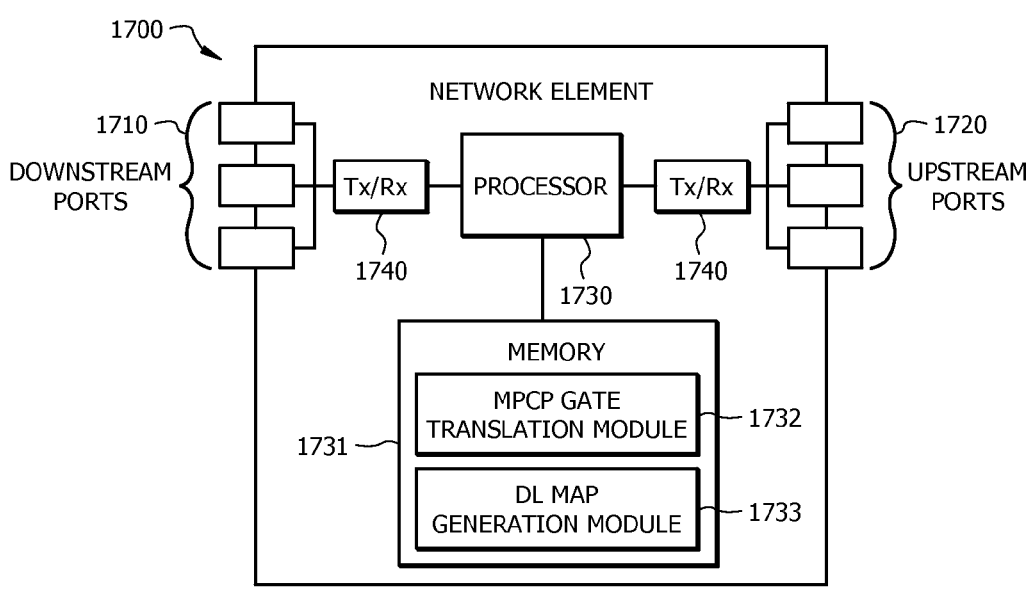
FIG. 17 is a schematic diagram of an embodiment of a network element.

At least some of the features/methods described in the disclosure may be implemented in a network element. For instance, the features/methods in the disclosure may be implemented using hardware, firmware, and/or software installed to run on hardware. The network element may be any device that transports data through a network, e.g., a switch, router, bridge, server, client, etc. FIG. 17 is a schematic diagram of an embodiment of a network element 1700, which may be any device that transports and processes data through a network. For instance, the network element 1700 may be a CMC implanting one of the schemes described herein. The network element 1700 may be configured to implement or support the MPCP gate translation and DL-MAP generation methods described above.

The network element 1700 may comprise one or more downstream ports 1710 coupled to a transceiver (Tx/Rx) 1740, which may be transmitters, receivers, or combinations thereof. The Tx/Rx 1740 may transmit and/or receive frames from other nodes via the downstream ports 1710. Similarly,

```
DSYM_COUNTER                                      ; downstream symbol counter at CMC
num_PRB                                           ; system constants
bits_per_PRB[LLID]                                ; dynamic plant conditions
FRAME = {LLID, length}                            ; format of Ethernet frame
DL_MAP[SYM_NO][PRB_NO]                            ; format of UL-MAP
DSYM_COUNTER = (DSYM_COUNTER + 1) % 75            ; point to next symbol
while (PRB table is not empty)
    Frame = get the next frame from the PON buffer
    for (i = 0; DL_MAP[sym_no][i] != 0; i = i + 1)    ; find empty PRB in symbol
    end for
    needed = Frame.length                         ; get the length of the frame
    while (needed > 0)                            ; allocate PRBs for entire grant
        DL_MAP[DSYM_COUNTER][i] = Frame.LLID      ; allocate PRB to LLID
        needed = needed - bits_per_PRB[LLID]
    end while
end while
``` the network element 1700 may comprise another Tx/Rx 1740 coupled to plurality of upstream ports 1720, wherein the Tx/Rx 1740 may transmit and/or receive frames from other nodes via the upstream ports 1720. A processor 1730 may be coupled to the Tx/Rxs 1740 and be configured to process the frames and/or determine which nodes to send the frames. The processor 1730 may comprise one or more multi-core processors and/or memory modules 1731, which may function as data stores, buffers, etc. Processor 1730 may be implemented as a general processor or may be part of one or more application specific integrated circuits (ASICs) and/or digital signal processors (DSPs). The downstream ports 1710 and/or upstream ports 1720 may contain electrical and/or optical transmitting and/or receiving components. Network element 1700 may or may not be a routing component that makes routing decisions. The memory modules 1731 may be used to house the instructions for carrying out the system and methods described herein, e.g., coax convergence layer in the CMC 120, CNU 130, etc. For example, the memory module 1731 may comprise a MPCP gate translation module 1732 with instructions for implementing the gate translation method 1300, and a DL-MAP generation module 1733 with instructions for implementing the DL-MAP generation method 1600, both of which may be executed by the processor 1730. Alternately, the MPCP gate translation module 1732 and the DL-MAP generation module 1733 may be implemented directly on the processor 1730. The MPCP gate translation module 1732 and the DL-MAP generation module 1733 may be implemented using software, hardware, or both. The memory module 1731 may comprise a cache for temporarily storing content, e.g., a Random Access Memory (RAM). Additionally, the memory module 1731 may comprise a long-term storage for storing content relatively longer, e.g., a Read Only Memory (ROM). For instance, the cache and the long-term storage may include dynamic random-access memories (DRAMs), solid-state drives (SSDs), hard disks, or combinations thereof.

It is understood that by programming and/or loading executable instructions onto the network element 1700, at least one of the processor 1730, the cache, and the long-term storage are changed, transforming the network element 1700 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method comprising:
   receiving a gate message from an Optical Line Terminal (OLT), wherein the gate message comprises a Logical Link Identifier (LLID), a grant start time, and a grant length;
   calculating an uplink symbol offset based on the grant start time;
   calculating an uplink symbol number based on the uplink symbol offset;
   searching empty Physical Resource Blocks (PRB) in the uplink symbol number in an uplink PRB table; and
   allocating uplink PRBs to the LLID according to the grant length specified in the gate message.

2. The method of claim 1, wherein calculating the uplink symbol number comprises adding the uplink symbol offset to a current value of an uplink symbol counter.

3. The method of claim 1, wherein the uplink PRB table comprises information regarding bits per uplink PRB for each LLID.

4. The method of claim 3, wherein the bits per uplink PRB change according to dynamic coax plant conditions.

5. The method of claim 3, wherein the bits per uplink PRB depend on at least one of a signal-to-noise ratio (SNR) and a bit error rate (ER).

6. The method of claim 1, further comprising:
   retrieving an Ethernet frame from a frame buffer;
   searching empty downlink PRBs in a next downlink symbol in a downlink PRB table; and
   allocating a set of downlink PRBs to the LLID according to a length of the Ethernet frame.

7. The method of claim 6, wherein each of the uplink PRBs and each of the downlink PRBs comprises multiple modulation profiles.

8. The method of claim 6, wherein the downlink PRB table comprises information regarding bits per downlink PRB for each LLID.

9. The method of claim 8, wherein the bits per downlink PRB change according to dynamic coax plant conditions.

10. The method of claim 8, wherein the bits per downlink PRB depend on at least one of a signal-to-noise ratio (SNR) and a bit error rate (ER).

11. An apparatus comprising:
    a memory;
    a processor coupled to the memory, wherein the memory includes instructions that when executed by the processor cause the apparatus to perform the following:
    receive a gate message from an Optical Line Terminal (OLT), wherein the gate message comprises a Logical Link Identifier (LLID), a grant start time, and a grant length;
    calculate an uplink symbol offset based on the grant start time;
    calculate an uplink symbol number based on the uplink symbol offset;
    search empty Physical Resource Blocks (PRB) in the uplink symbol number in an uplink PRB table; and
    allocate uplink PRBs to the LLID according to the grant length specified in the gate message.

12. The apparatus of claim 11, wherein calculating the uplink symbol number comprises adding the uplink symbol offset to a current value of an uplink symbol counter.

13. The apparatus of claim 11, wherein the uplink PRB table comprises information regarding bits per uplink PRB for each LLID.

14. The apparatus of claim 13, wherein the bits per uplink PRB change according to dynamic coax plant conditions.

15. The apparatus of claim 13, wherein the bits per uplink PRB depend on at least one of a signal-to-noise ratio (SNR) and a bit error rate (ER).

16. A coaxial media converter (CMC) comprising:
    a physical layer in communication with an Optical Line Terminal (OLT), wherein the CMC is configured to:
    receive a gate message from the OLT, wherein the gate message comprises a Logical Link Identifier (LLID), a grant start time, and a grant length;
    calculate an uplink symbol offset based on the grant start time;
    calculate an uplink symbol number based on the uplink symbol offset;
    search empty Physical Resource Blocks (PRB) in the uplink symbol number in an uplink PRB table; and
    allocate uplink PRBs to the LLID according to the grant length specified in the gate message.

17. The CMC of claim 16, wherein calculating the uplink symbol number comprises adding the uplink symbol offset to a current value of an uplink symbol counter.

18. The CMC of claim 16, wherein the uplink PRB table comprises information regarding bits per uplink PRB for each LLID.

19. The CMC of claim 18, wherein the bits per uplink PRB change according to dynamic coax plant conditions.

20. The CMC of claim 18, wherein the bits per uplink PRB depend on at least one of a signal-to-noise ratio (SNR) and a bit error rate (ER).

* * * * *